Patented Oct. 25, 1949

2,485,549

UNITED STATES PATENT OFFICE 2,485,549

BICYCLIC COMPOUNDS AND PROCESS FOR THE MANUFACTURE OF SAME

Erich Adler, Lidingo, near Stockholm, and Bengt Sven Hägglund, Stockholm, Sweden, assignors to Hoffmann-La Roche Inc., Nutley, N. J., a corporation of New Jersey No Drawing. Application October 12, 1945, Serial No. 622,080. In Sweden November 20, 1944

5 Claims. (Cl. 260—479)

The present invention relates to bicyclic compounds derived from indene, particularly of such having an oestrogenic action, and a process for the manufacture of the same. In accordance with this invention such compounds can be obtained by causing an acid metal halide known to be a cyclisating agent, such as, for instance, BF₃, AlCl₃, ZnCl₂ or SnCl₄, to act on butadiene derivatives of the formula

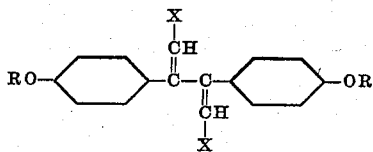

in which X stands for hydrogen or alkyl and R stands for hydrogen, alkyl or acyl, in presence of a solvent remaining indifferent in the reaction mixture, if necessary treating the reaction product, the hydroxyl groups of which are suitably etherified or esterified for this purpose, by a method causing shift of the double bond, such as heating in the presence of bases, for instance pyridine or quinoline, and, if required, splitting off the ether or ester groups by saponification. The course of the reaction probably proceeds according to the following formulae:

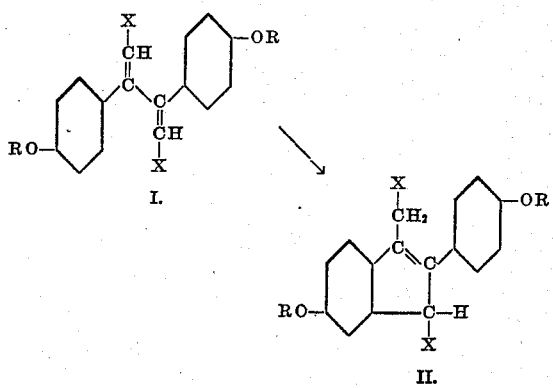

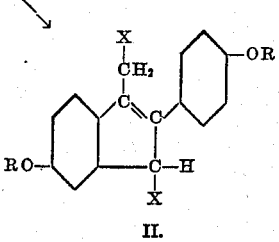

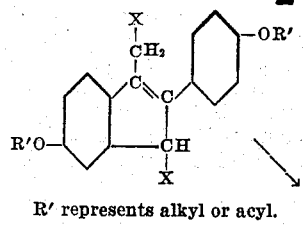

R' represents alkyl or acyl.

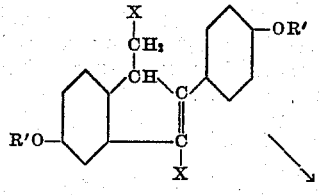

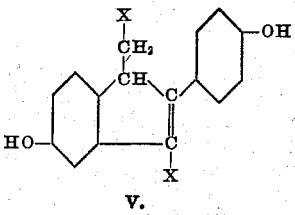

As starting materials (Formula I), particularly 2,3-di-(p-hydroxyphenyl)-butadiene-(1,3) and its homologues, especially diene-oestrols and iso-diene-oestrols, can be used. For the purpose of carrying out the first step, the two phenolic hydroxyl groups may either be free or else etherified (the oxygen atoms carrying a lower saturated alkyl group) or esterified, for instance with a lower, saturated fatty acid radical, such as acetyl or propionyl or with benzoyl.

The first step of the reaction, i. e., the formation of the five-membered ring, takes place under the influence of materials having a cyclisating action. Particularly the reagents known in connection with the Friedel-Crafts synthesis may be employed, for instance borofluoride, aluminium chloride, zinc chloride or tin tetrachloride. The reaction should proceed under exclusion of water. Thus, anhydrous solvents should be used which remain indifferent towards the materials present, such as, for instance, chloroform. The reaction already occurs at room temperature, but in cases where no undesirable side-reactions must be feared, slight heating may be applied. In the case of particularly sensitive starting materials, however, the cyclisation has to be effected while cooling.

The products of the first reaction step can be converted into transformation products by treatment with agents causing shifting of the double bond. For this rearrangement, such indene derivatives are suitably employed the phenolic hydroxyl groups of which are protected by etherification or esterification in the same manner as indicated above. Heating in presence of organic bases, such as, for instance, pyridine or quinoline, is a suitable means to effect shifting of the double bond. If, for the first reaction step, a butadiene derivative carrying free hydroxyl groups is used as starting material, the hydroxyl groups of the resulting indene thus also being free, it is expedient to etherify or esterify the hydroxyl groups prior to displacing the double bond. If desired, the displacement of the double bond may take place simultaneously with the esterification of the phenolic hydroxyl groups by heating the initially obtained indene derivatives with a mixture of a base and an acid anhydride, for instance with a mixture of pyridine and acetic anhydride.

This rearrangement probably represents a shift of the double bond within the five-membered ring known to occur in the indene series, such shift being connected with a migration of hydrogen atoms (prototropy).

The new products obtained in accordance with the present invention [especially 1-methyl-2-(p-hydroxyphenyl)-3-ethyl-6-hydroxy-indene, its transformation product, the 1-ethyl-2-(p-hydroxyphenyl)-3-methyl-5-hydroxy-indene, as well as their esters] show an excellent oestrogenic action when tested biologically. The action of the esters, particularly of the propionates, is markedly protracted, as is therapetically desirable in many cases.

The following examples are illustrative of the invention and of the various reaction steps.

*Example 1*

Borofluoride is passed into a solution of 5 parts by weight of 1,4-dimethyl-2,3-di-(p-hydroxyphenyl)-butadiene-(1,3) (i. e. diene-oestrol) in 1000 parts by volume of chloroform at room temperature during 30 minutes with exclusion of moisture. Thereby, a brown-coloured oil separates and the solution takes up a violet brown-colouring. On shaking with a bicarbonate solution, the solution after having temporarily been rose-coloured becomes almost completely decolourised and the oil dissolves in the chloroform layer. The same is dried with anhydrous sodium sulphate and concentrated to half its volume. On standing in the refrigerator, 3.5 parts by weight of the reaction product precipitate in the form of fine needles; further portions of the same substance are obtained from the mother liquor. The total yield of the crude product of melting point 172-174° C. amounts to 4.6 parts by weight, corresponding to 92° per cent. By recrystallisation from dilute alcohol, the pure 1-methyl-2-(p-hydroxyphenyl-3-ethyl-6-hydroxy-indene of melting point 175-176° C. is obtained. By boiling the substance with acetic anhydride for 20 minutes, its diacetate melting at 117-118° C. may be obtained. With propionic acid anhydride, the dipropionate of melting point 92-93° C. is obtained in an analogous manner.

*Example 2*

1.5 parts by weight of 2,3-di-(p-acetoxyphenyl-butadiene are dissolved in 75 parts by volume of chloroform. Borofluoride is passed into the solution for 10 minutes at room temperature and the solution, which has now turned brown, allowed to stand for another 30 minutes. After decomposition with sodium-acetate solution, the chloroform solution is dried and evaporated in vacuo. The oily residue, on being recrystallised from alcohol, yields 2-(p-acetoxyphenyl)-3-methyl-6-acetoxy-indene of melting point 133-134° C., crystallising in long-shaped flakes. Yields 75-80 per cent.

Starting from diene-oestrol-diacetate, 1-methyl-2-(p-acetoxyphenyl)-3-ethyl-6-acetoxy-indene of melting point 117-118° C. can be obtained in an analogous manner.

*Example 3*

15 parts by weight of 1-methyl-2-(p-acetoxyphenyl)-3-ethyl-6-acetoxy-indene (melting point 117-118° C.) are dissolved in 150 parts by volume of pyridine and heated on a boiling water bath for 4½ hours. On carefully diluting with water, the reaction product is precipitated in crystalline form and sucked off after standing for a while in the refrigerator. On recrystallising from not too little alcohol, one obtains as first fraction 11.1 parts by weight, i. e. 74 per cent. of the starting material, of the isomer, 1-ethyl-2-(p-acetoxyphenyl-3-methyl-5-acetoxy-indene melting at 150-151° C. From the mother liquors, 3.35 parts by weight (i. e. 22.5 per cent.) of the unchanged starting material are crystallised out. The diacetate of melting point 150-151° C., on standing for 12 hours, can be saponified at room temperature with alcoholic potassium hydroxide to yield 1-ethyl-2-(p-hydroxyphenyl)-3-methyl-5-hydroxy-indene which melts at 128-129° C. when recrystallised from benzene. It yields a dipropionate melting at 95-96° C.

*Example 4*

1 part by weight of 1-methyl-2-(p-hydroxyphenyl)-3-ethyl-6-hydroxy-indene (melting point 175° C.) is dissolved in 10 parts by volume of pyridine and, after addition of 5 parts by volume of acetic anhydride, heated on a water bath for 4 hours. By decomposition with water, the mixture of the two isomeric indene diacetates is obtained, from which, as indicated in Example 3, the 1-ethyl-2-(p-acetoxyphenyl)-3-methyl-5-acetoxy-indene (melting point 150-151° C.) and the 1-methyl-2-(p-acetoxyphenyl)-3-ethyl-6-acetoxy-indene (melting point 117-118° C.) can be isolated by fractionated crystallisation from alcohol in a yield of 69 and 24 per cent, respectively.

We claim:

1. 1-methyl-2-(p-acetoxyphenyl)-3-ethyl-6-acetoxy-indene.

2. Process for the manufacture of 1-methyl-2-(p-acyloxyphenyl)-3-ethyl-6-acyloxy-indene-(2), comprising acting upon 1,4-dimethyl-2,3-di-(p-acyloxyphenyl)-butadiene-(1,3) with borofluoride in the presence of an inert solvent and recovering the bicyclic compound formed.

3. Process for the manufacture of 1-methyl-2-(p-acetoxyphenyl)-3-ethyl-6-acetoxy-indene- (2), comprising acting upon 1,4-dimethyl-2,3-di-(p-acetoxyphenyl)-butadiene-(1,3) with borofluoride in the presence of an inert solvent and recovering the bicyclic compound formed.

4. Process for the manufacture of a bicyclic compound corresponding to the formula

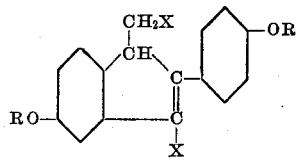

comprising acting upon the butadiene derivative of the formula

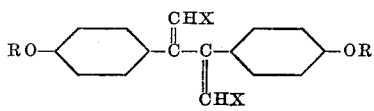

with an acid metal halide in the presence of an inert solvent, reacting the bicyclic compound formed with an organic cyclic base, selected from the group consisting of pyridine and quinoline, and recovering the substance obtained, wherein in the above formulae R is a member of the group consisting of hydrogen, lower saturated acyl and lower saturated alkyl, X being a member of the group consisting of hydrogen and lower saturated alkyl.

5. A bicyclic compound corresponding to the formula:

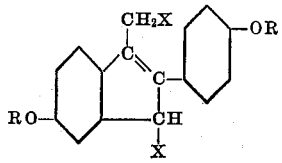

wherein R is a lower saturated acyl radical and X is a lower saturated alkyl.

ERICH ADLER.
BENGT SVEN HÄGGLUND.

REFERENCES CITED

The following references are of record in the file of this patent:

UNITED STATES PATENTS

| Number | Name | Date |
| --- | --- | --- |
| 2,281,956 | Salzer | May 5, 1942 |

OTHER REFERENCES

Solmssen, "Jour. Am. Chem. Sec." 65, 2370–2375 (1943).